April 6, 1971 A. GUMUCHIAN 3,574,058

NUCLEAR FUEL ASSEMBLY

Filed Nov. 27, 1967

United States Patent Office 3,574,058
Patented Apr. 6, 1971

3,574,058
NUCLEAR FUEL ASSEMBLY
André Gumuchian, Paris, France, assignor to Commissariat a l'Energie Atomique, Paris, France
Filed Nov. 27, 1967, Ser. No. 685,862
Claims priority, application France, Dec. 5, 1966, 86,219
Int. Cl. G21c 3/32
U.S. Cl. 176—78                                    7 Claims

ABSTRACT OF THE DISCLOSURE

A nuclear fuel assembly comprising at least one bundle of pins provided with expansion chambers and disposed within a tubular box which constitutes a coolant circulation system.

The box comprises a central tubular support structure having a bottom end-fitting and a top end-fitting or lifting head. The tubular structure serves to support the pins and constitutes an axial duct which by-passes the space located between the expansion chambers.

---

The present invention is directed to a core assembly for nuclear reactors and more especially for fast reactors which are cooled by circulating liquid metal vertically through the reactor core.

A nuclear fuel assembly for fast reactors usually consists of at least one bundle of pins each consisting of a rod of fissile or fertile material contained in a leak-tight can and placed in a tubular box which constitutes a circulation system for the flow of liquid metal coolant, said pins being attached to said box at one of their extremities. The term "rod" must be understood to designate either a slug or (as is most frequently the case) a stack of pellets of small size. Assemblies of this type are described in a large number of earlier documents to which reference can be made, notably French Pat. No. 1,291,633 to Commissariat à l'Energie Atomique, which describes an assembly comprising three superposed bundles of pins disposed in a box having a cross-section of hexagonal shape. Said box is constituted by a tubular sleeve provided with a top end-fitting or lifting head and with a bottom end-fitting which is intended to engage in a diagrid, the function of said diagrid being to support all of the assemblies. The pins which form part of a bundle are disposed on a triangular lattice and each bundle is supported on a grid or on rails which are secured to the bottom end-fitting in the case of the bottom bundle and to the sleeve in the case of the two other bundles.

The central pin bundle contains fissile material and the two outer pin bundles either contain fertile material or constitute a neutron shield. According to an alternative form which is illustrated and described on pages 84–86 of the July-August 1965, issue of the "Bulletin d'Informations Scientifiques et Techniques" (published by Dunod, Paris), the assembly also comprises a top neutron shield plug which is added to the three pin bundles. According to another alternative form of construction, the fissile material and fertile material which constitute the top and bottom axial blankets are integrated in a single bundle which is also made up of pins of substantial length.

The arrangements described in the foregoing have on the whole proved satisfactory but are nevertheless subject to disadvantages. In the first place, except in the case of fuel assemblies which are provided wtih vents, the pins containing fissile material comprise a can which delimits, beyond a portion containing said material (usually a stack of oxide pellets), an expansion chamber which is intended to collect the fission gases. The length of said chamber can be of the same order as that of the fuel portion. In point of fact, the greater part of the pressure drop to which the coolant is subject within a fuel assembly of the type referred-to above takes place as said coolant flows through the central bundle of pins, the diameter of the pins of this bundle being smaller than that of the pins of the top and bottom bundles. The expansion or gas collection chambers, the length of which is approximately one-half that of the pins are therefore responsible for an appreciable proportion (approximately one-third in the case of an assembly consisting of three superposed bundles) of the total pressure drop sustained by the coolant within the assembly. In other words, since the delivery head of the pumps for circulating the reactor coolant is mostly employed for the purpose of overcoming the pressure drop which occurs as the coolant flows through the fuel assemblies, approximately one quarter of the delivery head referred-to is required for the expansion chamber alone. However, since no heat is released at this point, it is unnecessary to provide for the same coolant flow rate as that which exists at the level of the fissile material.

Secondly, a further disadvantage is also present in the so-called "fertile" assemblies comprising a single bundle of pins of substantial length which are loaded with fertile material: the assembly of pin bundles within the box is a difficult operation and calls for adequate clearances; since the function of the box is to ensure structural rigidity of the assembly, the sleeve must be of substantial thickness and its cost is relatively high.

The present invention is directed to the construction of a fuel assembly which meets practical requirements more effectively than comparable assemblies of the prior art, especially insofar as it removes or at least circumvents the disadvantages mentioned above.

To this end, the fuel assembly in accordance with the invention, of the type comprising at least one bundle of pins provided with expansion chambers and disposed in a tubular box constituting a coolant circulation system, is primarily characterized in that the box comprises a central tubular support structure which is fixed at one end to a bottom end-fitting and provided at the other end with a lifting head, the function of said tubular structure being to support the pins and to form an axial duct which is mounted as a by-pass across the space formed between the expansion chambers.

In a preferred embodiment of the invention, the box comprises a thin sleeve placed around the bundle or bundles of pins and in close contact with the outer pins of said bundles while providing a substantially leak-tight separation between the bundles of pins and the bundles of adjacent assemblies. In this embodiment, said sleeve only plays the part of a partition which guides the flow and is not intended to serve as a support since this function is left solely to the tubular support structure.

A fuel assembly in accordance with the invention will now be described by way of non-limitative example, reference being made to the accompanying drawings, in which.

Figure 1:
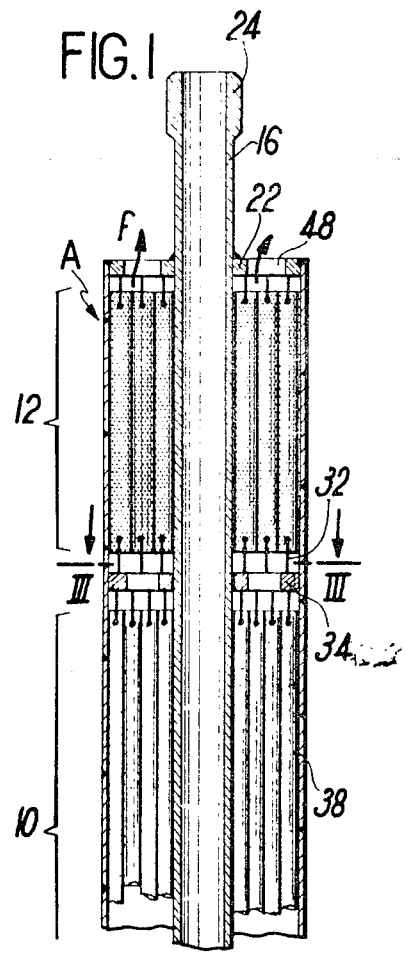
FIGS. 1 and 2 are views in elevation of the upper portion and lower portion of an assembly as shown in cross-section along the vertical mid-plane.
Figure 2:
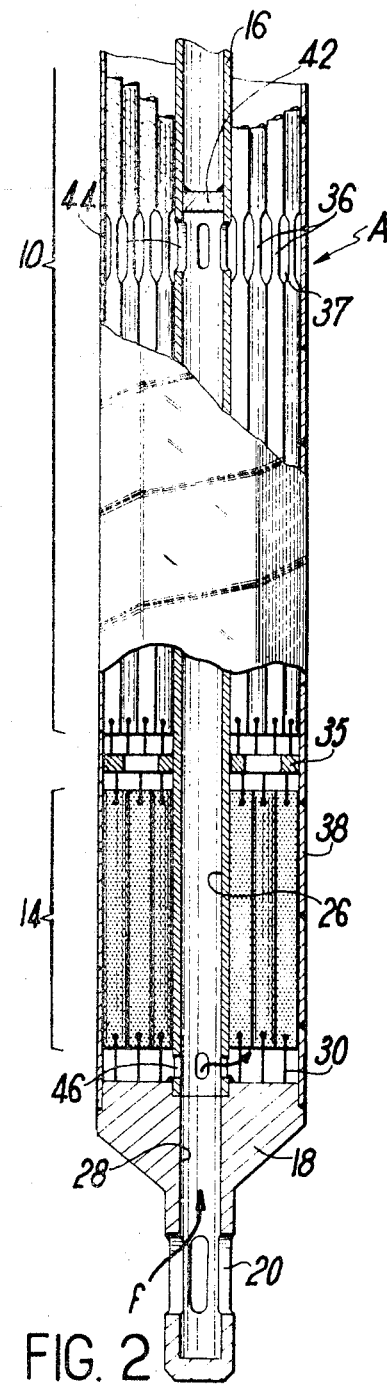
Figure 3:
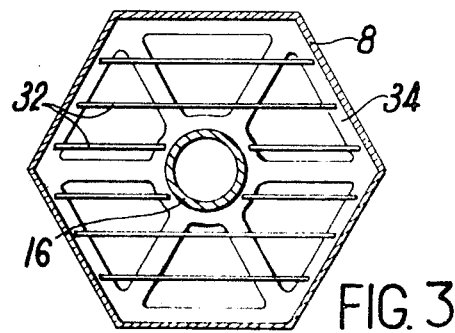
FIG. 3 is a view in cross-section along the line III—III of FIG. 1.

The assembly 4 which is shown in FIGS. 1 and 2 comprises a box containing a central bundle 10 of pins loaded with fissile material and located in the vertical direction between a top bundle 12 and a bottom bundle 14 formed of pins which are loaded either with fertile material or with neutron-absorbing material. The rigidity of the box and the interlocking of the different components of the assembly are ensured by means of a tubular structure 16, the lower end of which is secured to a massive bottom end-fitting 18 provided with coolant inlets 20. An annular plate 22 which is fixed by welding, for example, is placed around the top portion of the tubular structure 16. The extremity of the tubular structure 16 is provided with an annular enlargement 24 which is designed to afford a firm hold for a handling grab.

In the mode of execution which is illustrated in the figures, the tubular structure is reduced to a simple tube defining a central cylindrical duct 26 which forms an extension of the admission duct 28 in the bottom end-fitting and communicates with the coolant inlets 20.

The pins which form part of the bottom bundle 14 and top bundle 12 are disposed on a triangular lattice; their lower ends are carried respectively on rails 30 which are fixed to the bottom end-fitting 18 and on rails 32 which are rigidly fixed to a grid 34, said grid being provided with openings for the flow of coolant and secured to the tubular structure 16, for example by welding. The upper ends of the pins are simply guided by means of rails respectively carried by a grid 35 which is similar to the grid 34 and by the plate 22.

The pins of the central bundle 10 are of smaller diameter than the pins of the top and bottom bundles 12 and 14, are also disposed on a triangular lattice, and are supported on rails which are secured to the grid 35. In order to permit of free expansion of the pins, the top portion of these latter is simply guided by another set of rails which are rigidly fixed to the grid 34. Each pin of the central bundle has an upper portion which is loaded with fissile material and takes up substantially one-half of the length of the can, and a lower portion which constitutes an expansion chamber. The can of each pin is provided between the portion which is loaded with fissile material and the expansion chamber with a necked portion 36: the spaces formed between said necked portions constitute a collector space 37, the function of which will become apparent hereinafter.

The string assembly of three bundles 12, 10 and 14 is contained in a thin-walled sleeve 38 which is attached to the bottom end-fitting and to the annular plate 22 and provides a separation (which does not as a rule have to be absolutely leak-tight) between said bundles and the bundles of adjacent assemblies.

The sleeve referred-to can advantageously be constructed in accordance with French patent application No. 86,218, filed by Commissariat à l'Energie Atomique.

At the level of the above-mentioned necked portions 36 (shown in FIG. 2) or slightly below this level, provision is made in the tubular structure 16 for a series of coolant outlets 44. The central duct 28 is sealed off above the necked portions 36 by means of a plug 42 which prevents the further upward flow of coolant. Finally, the tubular structure 16 also comprises a series of discharge ports 46 of small area compared with the outlets 44; said ports 46 open into the space which is formed between the bottom end-fitting and the lower end of the bottom bundle 14 (as shown in FIG. 2).

In a preferred mode of execution of the invention, the cross-sectional area provided for the coolant flow by the central duct 26 of the structure is of the same order as the total cross-sectional area of the clearances existing between bundle and rigid sleeve in a prior art assembly of conventional type; the transverse cross-sectional area of this structure can be of the same order as that of the sleeve of a conventional assembly: under these conditions, the percentage of fissile or fertile material remains virtually the same as in conventional assemblies.

The circulation of coolant within an assembly of this type is evident from the figures: the coolant which is admitted in the direction of the arrows f through the inlets 20 flows up along the duct 28. The greater part of the flow passes upwardly within the duct 26 of the central structure 16 and is discharged through the outlets 44, thus by-passing the bottom bundle 14 and that portion of the central bundle 10 which is reserved for the expansion chambers. A fraction of the flow which can be regulated by modifying the dimensions of the ports 46 passes out of the central structure 16 beneath the string of bundles and irrigates the bottom bundle 14 and the expansion chambers. The collector space which is formed by the juxtaposition of residual spaces between the necked portions 36 permits a good distribution of coolant and uniform cooling of that portion of the central bundle 10 which is loaded with fissile material. The total coolant flow irrigates this portion of the pins of the central bundle 10 and the top bundle 12 before passing out through openings 48 formed in the annular plate 22. The intermediate grids 34 and 35 are provided with wide openings in order that the coolant should be subject only to a small pressure drop.

A number of alternative forms of execution may evidently be contemplated. In particular, the pins loaded with fissile material can be placed in such a manner that their expansion chambers are located at the top. In this case, the coolant flows around the central structure up to the top end of the fissile portion of the pins of the central bundle, then flows for the most part within the tubular structure 16 and finally passes out at the top end of the assembly.

The invention is of particular interest in the case of assemblies comprising a plurality of bundles of the type hereinabove described but is also applicable to assemblies which comprise a single bundle in which fissile material and fertile material are grouped together, and also to radial blanket assemblies composed of a single bundle of pins which are loaded solely with fertile material.

It is apparent that, in all cases, the assemblies in accordance with the invention secure the desired advantages. The major part of the coolant flow does not pass around the expansion chambers of the fissile pins or around the pins of the bottom bundle, but inside a duct of substantial cross-sectional area, with the result that the pressure drop at these levels is of a very low order. The central tubular structure makes provision for a zone which is devoid of pins and which can be employed, for example, for the purpose of accommodating a control rod, a measuring instrument, a device for locking the assembly in position, special pins, an irradiation capsule, and so forth. Should such a possibility not be contemplated, a part of the flow which has irrigated the central bundle 10 can in that case be diverted into the central structure.

Moreover, the use of a central tubular structure 16 according to the present invention in combination with a sleeve 38 which is made up of a spirally-wound strip removes the difficulties normally attached to the insertion of bundles in a box which comprises a rigid sleeve and reduces the dangers of vibration. Thus, the pins can be disposed with zero clearance around the central structure and are rigidly maintained against this latter by the outer spirally-wound sleeve. Although it may be conceded that the strength of the support structure is inferior to that of an outer sleeve or casing which is formed in one piece, the relative flexibility which results from this design can prove beneficial in the case, for example, of withdrawal of a damaged assembly from other assemblies which are set in the reactor diagrid.

Although only one form of execution of the invention has been illustrated by way of example, it must be understood that the protection afforded by this patent extends to alternative forms of either all or part of the arrangements described which remain within the definition of equivalent mechanical means.

What I claim is:

1. In a nuclear fuel assembly, the combination comprising an elongated tubular casing, a support structure located in and longitudinally of said casing, a bottom end-fitting and a top end-fitting respectively connecting the lower ends and upper ends of said support structure and of said casing, at least one bundle of fuel pins extending longitudinally in said casing, a can for each of said fuel pins, part of said can containing nuclear fuel and a part of said can forming a gas collection chamber, said casing and said pin cans defining a coolant circulation conduit, means carried by said support structure supporting said pins, and longitudinal duct means formed in said support structure and by-passing at least that portion of the coolant circulation conduit formed by said parts of said pins forming gas collection chambers.

2. A fuel assembly according to claim 1, comprising two end bundles of pins loaded with fertile material located one above and one under a central bundle of said pins loaded with fissile material, wherein said longitudinal duct means by-passes the expansion chambers and that end bundle which is adjacent to said chambers.

3. A fuel assembly in accordance with claim 2, wherein the cans of the pins of the central bundle each have a portion of decreased outer cross-section between the portion which is loaded with fissile material and said gas collection chamber.

4. A fuel assembly in accordance with claim 3, wherein the duct of said support structure communicates with a coolant inlet in the bottom end-fitting of the assembly and also communicates through coolant outlets with a collector space defined by said necked portions, and wherein said duct is closed above said coolant outlets.

5. A fuel assembly in accordance with claim 2, wherein said duct communicates with a space located beneath the bottom end bundle by ports of small cross-sectional area.

6. A fuel assembly as described in claim 1, said means supporting said pins comprising rails secured to said support structure.

7. A nuclear fuel assembling according to claim 1, wherein said support structure comprises a tubular structure located co-axially with said casing.

References Cited

UNITED STATES PATENTS

| | | | |
|---|---|---|---|
| 3,197,381 | 7/1965 | Blake | 176—78X |
| 3,207,670 | 9/1965 | Forteseve et al. | 176—37 |
| 3,274,070 | 9/1966 | Vanslager | 176—37X |
| 3,357,893 | 12/1967 | Gatley et al. | 176—37X |
| 3,368,945 | 2/1968 | Keller et al. | 176—78X |
| 3,386,885 | 6/1968 | Wright | 176—37 |

CARL D. QUARFORTH, Primary Examiner

M. J. SCOLNICK, Assistant Examiner